US012540715B2

(12) United States Patent
Lee et al.

(10) Patent No.: US 12,540,715 B2
(45) Date of Patent: Feb. 3, 2026

(54) LIGHTING DIFFUSER PLATE FOR COLLECTING AND RECYCLING LIGHT ENERGY, AND LIGHTING APPARATUS SYSTEM COMPRISING SAME

(71) Applicant: DONGGUK UNIVERSITY INDUSTRY-ACADEMIC COOPERATION FOUNDATION, Seoul (KR)

(72) Inventors: Jae Joon Lee, Seoul (KR); Ki Cheon Yoo, Gyeonggi-do (KR); Hyeong Cheol Kang, Busan (KR)

(73) Assignee: DONGGUK UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 34 days.

(21) Appl. No.: 18/696,043

(22) PCT Filed: Apr. 22, 2022

(86) PCT No.: PCT/KR2022/005764
§ 371 (c)(1),
(2) Date: Mar. 27, 2025

(87) PCT Pub. No.: WO2023/048350
PCT Pub. Date: Mar. 30, 2023

(65) Prior Publication Data
US 2025/0216053 A1 Jul. 3, 2025

(30) Foreign Application Priority Data
Sep. 27, 2021 (KR) ........................ 10-2021-0126929

(51) Int. Cl.
*F21V 5/00* (2018.01)

(52) U.S. Cl.
CPC ...................................... *F21V 5/00* (2013.01)

(58) Field of Classification Search
CPC .......... H10F 10/00; H10F 39/15; H10F 71/00; H10F 77/20; F21V 5/00; F21V 3/0625; Y02E 10/542
See application file for complete search history.

(56) References Cited

U.S. PATENT DOCUMENTS 8,987,756 B2 * 3/2015 Kim ........................ F21V 29/67 257/82
2013/0269781 A1 10/2013 Ko et al.
(Continued)

FOREIGN PATENT DOCUMENTS

KR 1020120012689 A 2/2012
KR 1020120063332 A 6/2012
(Continued)

OTHER PUBLICATIONS

International Search Report dated Mar. 30, 2023, in International Application No. PCT/KR2022/005764.
(Continued)

*Primary Examiner* — Robert J May
(74) *Attorney, Agent, or Firm* — Dinsmore & Shohl LLP; Yongsok Choi, Esq.

(57) ABSTRACT

The present disclosure relates to a lighting diffuser plate for collecting light energy from an artificial light source, which is provided with: (a) a photo-electrode formed on a conductive substrate or a flexible substrate and including a metal-oxide nanoparticle porous film onto which a photosensitive dye is adsorbed; (b) a counter electrode provided to face the photo-electrode at a distance, formed on the conductive substrate or the flexible substrate and including a nanoparticle metal film layer; and (c) a liquid electrolyte composition filled between the photo-electrode and the counter
(Continued)

electrode, and a lighting apparatus system including the lighting diffuser plate.

9 Claims, 7 Drawing Sheets

(56) References Cited

U.S. PATENT DOCUMENTS

| | | | |
|---|---|---|---|
| 2013/0320360 | A1 | 12/2013 | Kim et al. |
| 2020/0395492 | A1 | 12/2020 | Chittibabu et al. |

FOREIGN PATENT DOCUMENTS

| | | | |
|---|---|---|---|
| KR | 1020130068227 | A | 6/2013 |
| KR | 1020130115687 | A | 10/2013 |
| KR | 101429759 | B1 | 8/2014 |
| KR | 1020180053813 | A | 5/2018 |

OTHER PUBLICATIONS

Korean Office Action dated Jun. 23, 2023 pertaining to Korean application No. 10-2021-0126929 filed Sep. 27, 2021, pp. 1-10.

* cited by examiner

LIGHTING DIFFUSER PLATE FOR COLLECTING AND RECYCLING LIGHT ENERGY, AND LIGHTING APPARATUS SYSTEM COMPRISING SAME

TECHNICAL FIELD

The present disclosure relates to a lighting diffuser plate for collecting and recycling light energy and to a next-generation lighting apparatus system comprising same. More particularly, the present disclosure relates to a lighting diffuser plate capable of collecting light energy from a light source which generates artificial light, such as an indoor lighting, and a lighting apparatus system comprising same, and more particularly to a high-efficiency/high-transmissive lighting diffuser plate installed below a light source, such as an LED lighting, and a lighting apparatus system configured integrally with the lighting diffuser plate to collect and recycle light energy.

BACKGROUND

The total power usage of the Korean in 2018 is 534 TWh (terawatt hour). Of the total power usage, 106.8 TWh, which corresponds to about 20%, is used in a lighting device. Once light energy generated in the lighting device is used to brighten the indoor, it is difficult to recycle the light energy anymore. If the light energy generated in the lighting device may be collected, it will be possible to recycle enormous amounts of light energy. For example, even if merely 1% of the power used in the lighting device per year may be recycled, it is possible to reuse about 1 TWh of power per year.

To achieve this, it is necessary to install a photoelectric conversion cell that may convert light energy into electricity at a location close to the lighting device. In this case, in order for the indoor lighting to function as the lighting itself and to collect the light energy generated from the lighting, a photoelectric conversion cell with significantly high efficiency is required. In addition, in order to use the lighting device for lighting purpose, which is the original purpose of the lighting device, even while collecting the light energy, the photoelectric conversion cell with transparency that does not block the light generated from the light source is required.

One of the most widely-known photoelectric conversion cells is a dye-sensitized solar cell (DSSC). DSSC, developed by Gratzel, et al. in Switzerland in 1991, is a photoelectric conversion cell composed of semiconductor nanoparticles mainly containing titanium dioxide ($TiO_2$), a dye for sunlight absorption, an electrolyte, and a platinum counter electrode.

DSSC uses environmentally harmless materials. Thus, there are no restrictions in terms of materials, and the manufacturing cost thereof is relatively inexpensive at ⅕ of the silicon solar cell in the related art. In addition, DSSC is attracting attention as a new type of solar cell because it has excellent performance even in weak or scattered light and does not require a complicated manufacturing process. In particular, DSSC is translucent, exhibits rich colors, is light in weight, and may be applied to the glass, so that DSSC may be installed in places such as the exterior of buildings, car glasses, and windows. Therefore, DSSC has a wider range of applications compared to other types of previously-known solar cells. However, the photoelectric conversion efficiency of DSSC in the related art is relatively low compared to other solar cells. In addition, in DSSC in the related art, when dyes and electrolytes made of organic materials are exposed to ultraviolet rays for a long period of time, the stability of DSSC is not expected, which makes commercialization difficult.

A lighting device using an artificial light source such as an LED lamp is usually equipped with a diffuser plate to diffuse light travelling linearly from the light source. In particular, LED lighting has a strong linearity so that the light is strongly emitted toward a direct lighting space below the lighting device, and may not be distributed evenly to other spaces. For this reason, in a typical LED lighting device, a diffuser plate is placed near the lower end of the light source so that the light emitted from the LED light source is dispersed toward the entire space below the lighting device by diffusion. The diffuser plate diffuses the light to provide a uniform amount of light in all directions below the LED lighting. However, during such a diffusion, a significant amount of light sources may be lost in a form that is difficult to recycle. In addition, the diffuser plate in the related art may fail to implement lights of various colors.

Therefore, in order to recycle an enormous amount of power used in the lighting device, there is a need to provide a lighting apparatus system equipped with DSSC in the form of a lighting diffuser plate, which has high efficient and high transparent properties enough to collect the light energy of the indoor lighting, and maintains the function of the lighting device itself even during the collection of the light energy. In addition, such a type of lighting may be significantly considered as one of next-generation standard lighting modes.

As Patent Documents in the related art, Korean Patent Application Publication No. 10-2012-0012689 (Patent Document 1) discloses a liquid crystal panel for window which may collect and recycle light entering a room via a window by a DSSC module and may be driven by a power supply generated based on the recycled light. Further, U.S. Patent Application Publication No. 2020/0395492 (Patent Document 2) discloses a DSSC that exhibits an improved performance under the condition of 1 sun and the condition of indoor irradiation.

However, although Patent Documents 1 and 2 disclose DSSC that recycles the solar light entering the indoor, they do not disclose a lighting diffuser plate that collects and recycles electricity from an artificial light itself, such as an indoor lighting.

Therefore, there is a need to provide a high-efficiency/high-transmissive lighting diffuser plate which is capable of maintaining unique functions of the lighting device and implementing various colors while efficiently collecting and recycling light energy generated from artificial light sources such as indoor lighting, and a lighting apparatus system including the lighting diffuser plate.

DOCUMENT IN RELATED ART

Patent Document

Patent Document 1: Korean Patent Application Publication No. 10-2012-0012689
Patent Document 2: U.S. Patent Application Publication No. 2020/0395492 A1

SUMMARY

The present disclosure is for the purpose of providing a lighting diffuser plate which exhibits a high photoelectric conversion efficiency even when using, as a light source, an artificial light source such as an indoor lighting, and a lighting apparatus system including the lighting diffuser plate.

Further, the present disclosure is for the purpose of providing a lighting diffuser plate which is made of a high transparent material and is capable of collecting light energy while maintaining an original function of an indoor lighting, and a lighting apparatus system including the lighting diffuser plate.

Further, the present disclosure is for the purpose of providing a lighting diffuser plate which is capable of variedly adjusting a color of lastly emitted light after collecting light energy, and a lighting apparatus system including the lighting diffuser plate.

As a result of earnest research conducted by the present inventors to solve the above-mentioned matters, the present inventors proposed a lighting diffuser plate which is capable of collecting light energy under an artificial light source as a light source, such as an indoor lighting, and a next-generation lighting apparatus system of a completely new concept which includes such a lighting diffuser plate.

Specifically, the present disclosure provides a lighting diffuser plate for collecting light energy from an artificial light source, which includes: (a) a photo-electrode formed on a conductive substrate or a flexible substrate and including a metal-oxide nanoparticle porous film onto which a photosensitive dye is adsorbed; (b) a counter electrode provided to face the photo-electrode at a distance, formed on the conductive substrate or the flexible substrate and including a nanoparticle metal film layer; and (c) a liquid electrolyte composition filled between the photo-electrode and the counter electrode, and a lighting apparatus system including the lighting diffuser plate.

According to an example embodiment of the present disclosure, the artificial light source is at least one selected from the group consisting of an LED lamp, a Red-Green-Blue lamp, and a fluorescent lamp.

According to an example embodiment of the present disclosure, a color temperature of the artificial light source may be within a range of 2,500 K (Kelvin) to 9,000 K, or a range of 3,000 K to 7,600 K. Specifically, the color temperature of the artificial light source may be about 3,200 K, about 5,000 K, about 5,500 K, or about 7,600 K.

According to an example embodiment of the present disclosure, the artificial light source is an LED lamp and the lighting diffuser plate is located below the LED lamp.

According to an example embodiment of the present disclosure, the photo-electrode and the counter electrode are formed on the conductive substrate, and the conductive substrate is a transparent glass substrate coated with a conductive film.

According to an example embodiment of the present disclosure, the conductive film includes $SnO_2$:F, ITO, a metal electrode having an average thickness of 1 to 1,000 nm (nanometer), a metal nitride, a metal oxide, a carbon compound, or a conductive polymer. Specifically, the conductive film is a fluorine-doped tin oxide layer (FTO) or an indium tin oxide layer (ITO).

According to an example embodiment of the present disclosure, the photosensitive dye is an organic-inorganic composite dye including an element selected from the group consisting of aluminum (Al), platinum (Pt), palladium (Pd), europium (Eu), lead (Pb), iridium (Ir), ruthenium (Ru), selenium (Se), teleride (Te), sulfur(S) and a complex thereof.

According to an example embodiment of the present disclosure, the color temperature of the transmitted light that passed through the lighting diffuser plate is within a range of 2,700 K to 7,600 K.

According to an example embodiment of the present disclosure, the photosensitive dye may be selected from the group consisting of N719 (bis(tetrabutylammonium)-cis-(dithiocyanato-N,N'-bis(4-carboxylato-4'-carboxylic acid-2, 2'-bipyridine) ruthenium(II)), D35 ((E)-3-(5-(4-(bis(2',4'-dibutoxy-[1,1'-biphenyl]-4-yl)amino)phenyl)thiophen-2-yl)-2-cyanoacrylic acid), HSQ4 ((3Z,4Z)-4-((5-carboxy-3,3-dimethyl-1-octyl-3H-indol-1-ium-2-yl)methylene)-2-(((E)-5-carboxy-3,3-dimethyl-1-octylindolin-2-ylidene)methyl)-3-(1-cyano-2-ethoxy-2-oxoethylidene)cyclobut-1-en-1-olate), or bTPA-DPP-DMP ((3Z,4Z)-4-((5-carboxy-3,3-dimethyl-1-octyl-3H-indol-1-ium-2-yl)methylene)-2-(((E)-5-carboxy-3,3-dimethyl-1-octylindolin-2-ylidene)methyl)-3-(1-cyano-2-ethoxy-2-oxoethylidene)cyclobut-1-en-1-olate), which are a ruthenium-based photosensitive dye.

According to an example embodiment of the present disclosure, the nanoparticle metal used when forming the nanoparticle metal film layer is at least one selected from the group consisting of platinum (Pt), activated carbon, graphite, carbon nanotube, carbon black, p-type semiconductor, PEDOT (poly (3,4-ethylenedioxythiophene))-PSS (poly (styrenesulfonate)), polyaniline-CSA, pentacene, polyacetylene, P3HT (poly(3-hexylthiophene), polysiloxane, polyaniline, polyethylene oxide, (poly(1-methoxy-4-(0-disperd1)-2, 5-phenylene-vinylene), polyindole, polycarbazole, polypyridinazine, polyisothianaphthalene, polyphenylene sulfide, polyvinylpyridine, polythiophene, polyfluorene, polypyridine, polypyrrole, polypersulfide, a derivative thereof, a copolymer thereof, and a mixture thereof.

According to an example embodiment of the present disclosure, the liquid electrolyte composition includes a redox derivative and an organic solvent.

According to an example embodiment of the present disclosure, the redox derivative is at least one selected from the group consisting of: a metal halide salt containing lithium iodide, sodium iodide, potassium iodide, lithium bromide, sodium bromide, and potassium bromide; a quaternary ammonium salt; an imidazolium salt; a pyridinium salt; a pyrrolidinium salt; a pyrazolium salt; an isothiazolidinium salt; an isooxazolidinium salt, and a cobalt-based nitrogen-containing heterocyclic compound.

According to an example embodiment of the present disclosure, the organic solvent contained in the liquid electrolyte composition is at least one selected from the group consisting of acetonitrile, 3-methoxypropionitrile, valeronitrile, ethylene carbonate, propylene carbonate, polyethylene glycol, polypropylene glycol, and tetrahydrofuran, or obtained by adding a room-temperature molten salt containing imidazolium and pyrrolidinium to the one or more elements.

A lighting apparatus system of the present disclosure includes an artificial light source, and the above-described lighting diffuser plate positioned below the artificial light source and configured to collect the light energy from the artificial light source.

The present disclosure relates to a lighting diffuser plate capable of collecting light energy from an artificial light source to recycle the light energy, and a next-generation lighting apparatus system including the lighting diffuser plate, which are capable of providing a design optimized for consumers and lighting environments and implementing various colors. This makes it highly usable as emotional lighting. In addition, the lighting diffuser plate and the lighting apparatus system comprising same may be manufactured as a self-charging and driving integrated system, which enables continuous use even in high-risk environments (fire, earthquake, power outage and the like).

In addition, the lighting diffuser plate and the lighting apparatus system comprising same may be operated without power even after installation. Thus, there are no restrictions on installation location. In addition, since an existing indoor lighting may be used as is, the installation is very easy, replacement is possible at low cost. The lighting diffuser plate and the lighting apparatus system comprising same may be designed to enable power supply based on an IoT-type sensor. This is very useful in smart environments.

DETAILED DESCRIPTION

Hereinafter, the present disclosure will now be described in detail with reference to the accompanying drawings.

A lighting diffuser plate of the present disclosure is capable of collecting light energy from an artificial light source, and includes: (a) a photo-electrode formed on a conductive substrate or a flexible substrate and including a metal-oxide nanoparticle porous film onto which a photo-sensitive dye is adsorbed; (b) a counter electrode provided to face the photo-electrode at a distance, formed on the conductive substrate or the flexible substrate and including a nanoparticle metal film layer; and (c) a liquid electrolyte composition filled between the photo-electrode and the counter electrode.

The artificial light source may include all light sources which may be used as an indoor lighting. Specifically, the artificial light source may include an LED (light-emitting device) lamp, an OLED (organic light-emitting device) lamp, an RGB (red-green-blue) lamp, a fluorescent lamp, an incandescent light, or the like. According to a preferred example embodiment of the present disclosure, the artificial light source may be one or more lamps selected from the group consisting of the LED lamp, the RGB lamp, and the fluorescent lamp. According to a further preferred example embodiment of the present disclosure, the artificial light source is the LED lamp.

Figure 1:
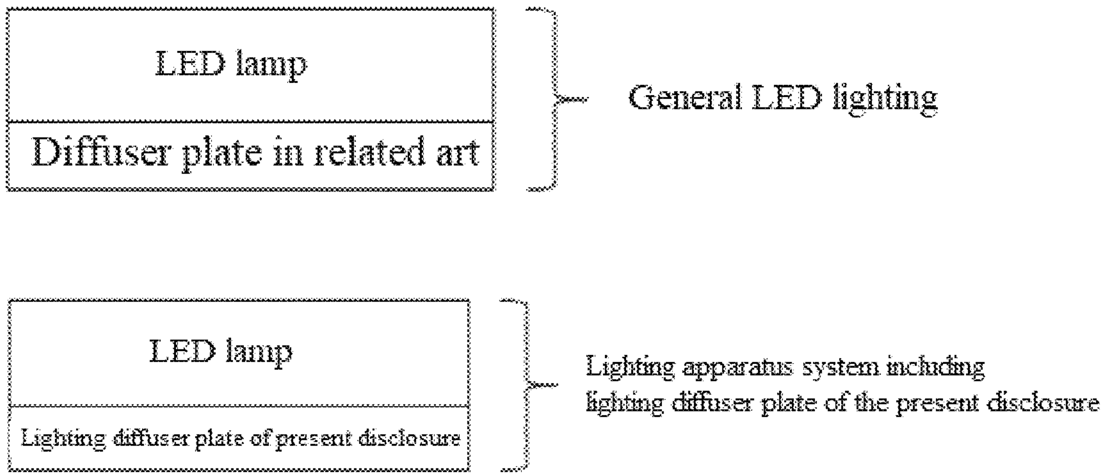
FIG. 1 is a comparative structural diagram of a novel lighting apparatus system including a general LED (light-emitting device) illumination and a lighting diffuser plate of the present disclosure.

A position where the lighting diffuser plate of the present disclosure is disposed in the lighting apparatus system is not particularly limited as long as the lighting diffuser plate may collect light energy from the artificial light source. FIG. 1 is a view illustrating an example of schematic comparison of a general LED lighting device and the lighting apparatus system including the novel lighting diffuser plate of the present disclosure.

According to an example embodiment of the present disclosure, the novel lighting diffuser plate of the present disclosure may be provided instead of or above an existing diffuser plate of the LED lighting device. In the case where the lighting diffuser plate of the present disclosure is provided instead of the existing diffuser plate, the lighting diffuser plate of the present disclosure may perform both a function of collecting light energy and a function of the existing diffuser plate itself. In the case where the lighting diffuser plate of the present disclosure is provided above the existing diffuser plate, light passing through the lighting diffuser plate of the present disclosure is diffused in the existing diffuser plate and is dispersed toward a lower space of the lighting device.

A substrate applied to a photo-electrode and a counter electrode of the lighting diffuser plate of the present disclosure is not particularly limited as long as it is used to DSSC (dye-sensitized solar cell). A conductive substrate or a flexible substrate may be used as the substrate. Preferably, in the present disclosure, the conductive substrate may include a transparent glass substrate coated with a conductive film, a flexible plastic substrate, or a metal substrate.

The transparent glass substrate coated with the conductive film, which is used for the photo-electrode and the counter electrode of the lighting diffuser plate of the present disclosure, may be a substrate coated with a transparent conducting oxide (TCO), specifically, a transparent glass substrate on which a tin oxide layer doped with fluorine (FTO) is formed, or a transparent glass substrate on which an indium tin oxide layer (ITO) is formed. More specifically, the transparent glass substrate coated with the conductive film may be a transparent glass substrate on which the tin oxide layer doped with fluorine (FTO) is formed.

The flexible substrate used for the photo-electrode and the counter electrode of the lighting diffuser plate of the present disclosure may be formed with one or more kinds of materials selected from the group consisting of polyethylene terephthalate; polyethylene naphthalate; polycarbonate; polypropylene; polyimide; triacetylcellulose; polyethersulfone; organic-modified silicate of a three-dimensional network structure formed by hydrolysis and condensation reaction of one or more organometallic alkoxides selected from the group consisting of methyltriethoxysilane, ethyltriethoxysilane and propyltriethoxysilane; copolymers thereof; and a mixture thereof.

The metal substrate used for the photo-electrode and the counter electrode of the lighting diffuser plate of the present disclosure may be formed with any one material selected from the group consisting of iron, stainless steel, aluminum, titanium, nickel, copper and tin.

Figure 2:
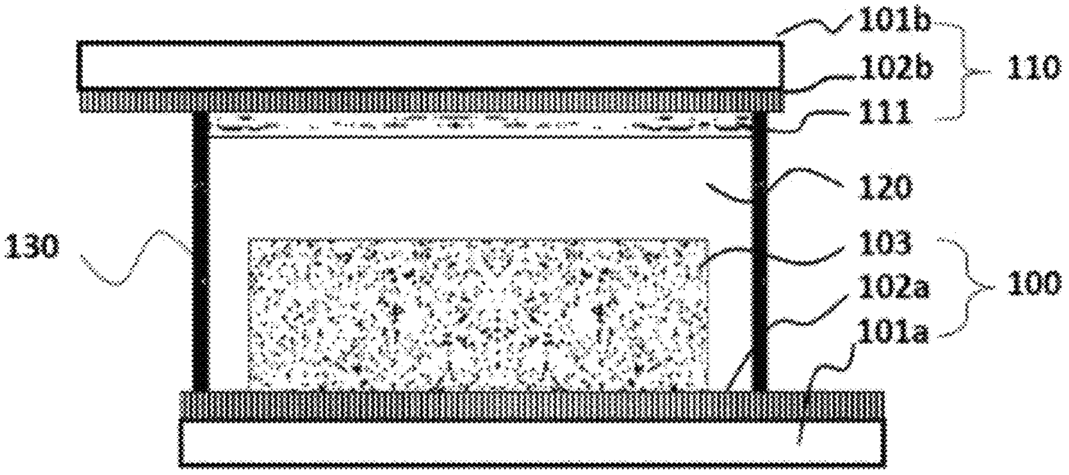
FIG. 2 is a detailed structural diagram of a lighting apparatus system including the lighting diffuser plate of the present disclosure.

FIG. 2 is an exemplary detailed structural diagram of the lighting diffuser plate of the present disclosure. According to an example embodiment of the present disclosure, the lighting diffuser plate is provided with: (a) a photo-electrode 100 including a transparent glass substrate (or a flexible substrate) 101*a*, a conductive transparent film 102*a* formed on the transparent glass substrate 101*a*, and a porous film 103 having metallic oxide nanoparticles formed on the conductive transparent film 102*a*; (b) a counter electrode 110 provided to face the photo-electrode and including a transparent glass substrate (or flexible substrate) 101*b*, a conductive transparent film 102*b* formed on the transparent glass substrate, and a nanoparticle metal film layer 111; and (c) an electrolyte 120 filled between the photoelectrode and the counter electrode.

The conductive transparent film used for the lighting diffuser plate of the present disclosure may include, but is not limited to, $SnO_2$:F, ITO, a metal electrode having an average thickness of 1 to 1,000 nm (nanometer), a metal nitride, a metal oxide, a carbon compound, or a conductive polymer. A conductive film well known in the field of the related art may be used as the conductive transparent film.

As the above-described metal nitride, one or more kinds of nitrides selected from the group consisting of: a nitride of IVB-group metal elements including titanium (Ti), zirconium (Zr) and hafnium (Hf); a nitride of VB-group metal elements including niobium (Nb), tantalum (Ta) and vanadium (V); a nitride of VIB-group metal elements including chromium (Cr), molybdenum (Mo) and tungsten (W); aluminum nitride; gallium nitride; indium nitride; silicon nitride; germanium; and a mixture thereof may be used.

As the metal oxide, one or more kinds of oxides selected from the group consisting of: tin (Sn) oxide; antimony (Sb)-, niobium (Nb)- or fluorine-doped tin (Sn) oxide; indium (In) oxide; tin-doped indium (In) oxide; zinc (Zn) oxide; aluminum (Al)-, boron (B)-, gallium (Ga)-, hydrogen (H)-, indium (In)-, yttrium (Y)-, titanium (Ti)-, silicon (Si)- or tin (Sn)-doped zinc (Zn) oxide; magnesium (Mg) oxide; cadmium (Cd) oxide; magnesium zinc (MgZn) oxide; indium zinc (InZn) oxide; copper aluminum (CuAl) oxide; silver (Ag) oxide; gallium (Ga) oxide; zinc Sn oxide (ZnSnO); titanium dioxide ($TiO_2$) and zinc indium (ZIS) oxide; nickel (Ni) oxide; rhodium (Rh) oxide; ruthenium (Ru) oxide; iridium (Ir) oxide; copper (Cu) oxide; cobalt (Co) oxide; tungsten (W) oxide; titanium (Ti) oxide; and a mixture thereof may be used.

As the above-described carbon compound, one or more kinds of materials selected from the group consisting of activated carbon, graphite, carbon nanotube, carbon black, graphene, or a mixture thereof may be used.

As the conductive polymer, one or more kinds of materials selected from the group consisting of PEDOT (poly(3,4-ethylenedioxythiophene))-PSS (poly(styrenesulfonate)), polyaniline-CSA, pentacene, polyacetylene, P3HT (poly(3-hexylthiophene), polysiloxane carbazole, polyaniline, polyethylene oxide, (poly 1-methoxy-4-(0-diperthread 1)-2,5-phenylene-vinylene), polyindole, polycarbazole, polypyridinazine, polyisothianaphthalene, polyphenylene sulfide, polyvinylpyridine, polythiophene, polyfluorene, polypyridine, polypyrrole, polysulfide, and a copolymer thereof.

The metal-oxide nanoparticle porous film used for the photo-electrode may be formed by applying a metal oxide nanoparticle paste including metal oxide nanoparticles, a polymer for a binder, and a solvent onto the above-described conductive glass substrate and then heat-treating the substrate.

The metal oxide nanoparticles used for the photo-electrode may be nanoparticles of one or more kinds of oxides selected from the group consisting of: tin (Sn) oxide; antimony (Sb)-, niobium (Nb)- or fluorine-doped tin (Sn) oxide; indium (In) oxide; tin-doped indium (In) oxide; zinc (Zn) oxide; aluminum (Al)-, boron (B)-, gallium (Ga)-, hydrogen (H)-, indium (In)-, yttrium (Y)-, titanium (Ti)-, silicon (Si)- or tin (Sn)-doped zinc (Zn) oxide; magnesium (Mg) oxide; cadmium (Cd) oxide; magnesium zinc (MgZn) oxide; indium zinc (InZn) oxide; copper aluminum (CuAl) oxide; silver (Ag) oxide; gallium (Ga) oxide; zinc Sn oxide (ZnSnO); titanium dioxide (TiO) and zinc indium (ZIS) oxide; nickel (Ni) oxide; rhodium (Rh) oxide; ruthenium (Ru) oxide; iridium (Ir) oxide; copper (Cu) oxide; cobalt (Co) oxide; tungsten (W) oxide; titanium (Ti) oxide; zirconium (Zr) oxide; strontium (Sr) oxide; lanthanum (La) oxide; vanadium (V) oxide; molybdenum (Mo) oxide; niobium (Nb) oxide; aluminum (Al) oxide; ytnium (Y) oxide; scandium (Sc) oxide; samarium (Sm) oxide; and strontium titanium (SrTi) oxide. More specifically, the metal oxide nanoparticles may be the titanium dioxide (TiO) nanoparticles.

A person skilled in the art may implement the lighting apparatus system including the lighting diffuser plate of the present disclosure which emits light of a desired color by appropriately selecting a color temperature of the artificial light source and a photosensitive dye used for the photo-electrode. Specifically, the color temperature of the artificial light source may be within a range of 2,500 K to 9,000 K, specifically 3,000 K to 7,600 K. More specifically, the color temperature of the artificial light source may be about 3,200 K, about 5,000 K, about 5,500 K, or about 7,600 K.

In addition, as the photosensitive dye, a dye having a band gap of 1.55 eV (electron volt) to 3.1 eV (electron volt) to absorb visible light may be used. For example, an organic-inorganic composite dye including a metal or a metal complex, an organic dye, or a mixture thereof may be used as the photosensitive dye. Examples of the organic-inorganic composite dye may include an organic-inorganic composite dye including an element selected from the group consisting of aluminum (Al), platinum (Pt), palladium (Pd), europium (Eu), lead (Pb), iridium (Ir), ruthenium (Ru), selenium (Se), telluride (Te), sulfur (S), and a complex thereof.

More specifically, the photosensitive dye may be one or more of DN-F01 (Dyenamo Yellow), DN-F13 (Dyenamo Cloudrery Orange), DN-F21 (SC-4), DN-FP01 (Pl), DN-F04M (D45), DN-F03 (D5), DN-F02 (L1), DN-F04 (Dyenamo Orange), DN-F0SM (D51), DN-F05Y (Y123), DN-FP02, DN-F05 (Dyenamo Red), DN-F18 (WS-72), DN-F16 (XY1), DN-F16B (XY1b), DN-F08 (JF419), DN-F09 (MKA253), DN-F19 (C218), DN-F20 (C268), DN-FlO (Dyenamo Blue), DN-FlOM (Dyenamo Blue 2016), DN-F11 (DPP13), DN-17 (R6), DN-F14 (Dyenamo Mareel Blue), DN-F12 (YD2), DN-F15 (Dyenamo Transparent Green) and DN-FI07 (MK245), which are commercial photosensitive dyes produced by the DYENAMO company.

Figure 3:
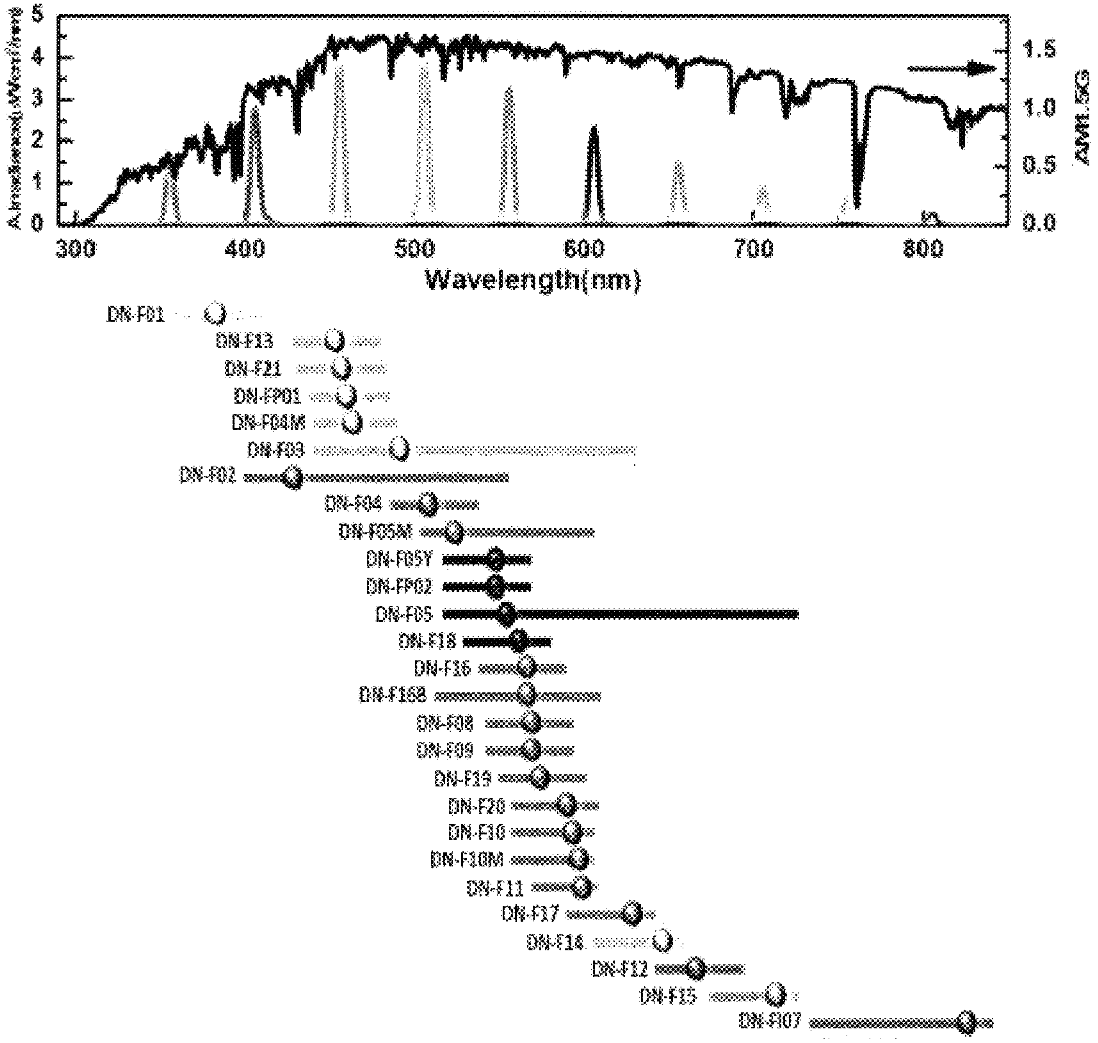
FIG. 3 is a graph illustrating absorbance bands of various dye materials for dye-sensitized solar cell.

Information about an absorbance band and the maximum absorbance band of these photosensitive dyes is illustrated in FIG. 3. FIG. 3 illustrates various commercial photosensitive dyes usable for DSSC and absorbance bands thereof in a crossbar form. The color of each dye is the same as a color of the crossbar, and a position of the maximum absorbance band is indicated by round dots on the crossbar.

According to further preferred example embodiments of the present disclosure, the photosensitive dye may be selected from N719 (bis(tetrabutylammonium)-cis-(dithiocyanato-N,N'-bis(4-carboxylato-4'-carboxylic acid-2,2'-bipyridine)ruthenium(II)) which is a ruthenium-based photosensitive dye, D35 ((E)-3-(5-(4-(bis(2',4'-dibutoxy-[1,1'-biphenyl]-4-yl)amino)phenyl)thiophen-2-yl)-2-cyanoacrylic acid), HSQ4((3Z,4Z)-4-((5-carboxy-3,3-dimethyl-1-octyl-3H-indol-1-ium-2-yl)methylene)-2-(((E)-5-carboxy-3,3-dimethyl-1-octylindolin-2-ylidene)methyl)-3-(1-cyano-2-ethoxy-2-oxoethylidene)cyclobut-1-en-1-olate), or bTPA-DPP-DMP((3Z,4Z)-4-((5-carboxy-3,3-dimethyl-1-octyl-3H-indol-1-ium-2-yl)methylene)-2-(((E)-5-carboxy-3,3-dimethyl-1-octylindolin-2-ylidene)methyl)-3-(1-cyano-2-ethoxy-2-oxoethylidene)cyclobut-1-en-1-olate), which are a ruthenium (Ru)-based photosensitive dye. Among these, N719 and D35 are known as photosensitive dyes for red light emission, HSQ4 is known as a photosensitive dye for green light emission, and b-TPA-DPP-DMP is known as a photosensitive dye for blue light emission.

The photosensitive dye used for the photo-electrode may be formed by being adsorbed to a surface of the metal-oxide nanoparticle porous film. Specifically, the photosensitive dye used for the photo-electrode may be adsorbed to the surface of the metal-oxide nanoparticle porous film by immersing a photo-electrode including the metal-oxide nanoparticle porous film in a solution containing the photosensitive dye.

A method of producing such a photosensitive dye-containing solution is not particularly limited and may be prepared by a method well known in the field of the related art.

The lighting apparatus system capable of implementing various colors by changing the above-described photosensitive dye used for the lighting diffuser plate of the present disclosure may be provided. According to an example embodiment of the present disclosure, the color temperature of the transmitted light transmitted through the lighting diffuser plate of the present disclosure may be adjusted within a range of 2,700 K to 7,600 K.

The nanoparticle metal used in the formation of the nanoparticle metal film layer used for the counter electrode may be one or more materials selected from the group consisting of platinum (Pt), activated carbon, graphite, carbon nanotube, carbon black, p-type semiconductor, PEDOT (poly(3,4-ethylenedioxythiophene))-PSS (poly(styrenesulfonate)), polyaniline-CSA, pentacene, polyacetylene, P3HT (poly(3-hexylthiophene), polysiloxane carbazole, polyaniline, polyethylene oxide, (poly(1-methoxy-4-(0-disperd 1)-2,5-phenylene-vinylene), polyindole, polycarbazole, polypyridinazine, polyisothianaphthalene, polyphenylene sulfide, polyvinylpyridine, polythiophene, polyfluorene, polypyridine, polypyrrole, polypersulfide, a derivative thereof, a copolymer thereof, a complex thereof, or a mixture thereof. Specifically, platinum (Pt) may be used.

A redox derivative contained in the electrolyte may be a halogenated metal salt such as lithium iodide, sodium iodide, potassium iodide, lithium bromide, sodium bromide, potassium bromide, or the like; or a nitrogen-containing heterocyclic compound such as quaternary ammonium salt, imidazolium salt, pyridinium salt, pyrrolidinium salt, pyrazolium salt, isothiazolidinium salt, isooxazolidinium salt, cobalt system or the like.

A derivative capable of providing a redox couple composed of I− and $I_3$− may be used as the above-described redox derivative. As an example, the redox couple composed of I− and $I_3$− may be produced by dissolving iodine ($I_2$) in a molten salt of iodide such as imidazolium iodide salt, or by dissolving iodine or iodide in a molten salt of a compound other than the iodide. In this case, as the imidazolium iodide salt, one type or a mixture of two or more types of compounds selected from the group consisting of 1,2-dimethyl-3-propylimidazolium iodide (DMPII), 1-methyl-3-propylimidazolium iodide (PMII), 1,3-dimethylimidazolium iodide, 1-methyl-3-ethylimidazolium iodide, 1-methyl-3-butylimidazolium iodide, 1-methyl-3-pentyl-imidazolium iodide, 1-Methyl-3-hexylimidazolium iodide, 1-methyl-3-heptylimidazolium iodide, 1-methyl-3-octylimidazolium iodide, 1,3-diethylimidazolium iodide, 1-ethyl-3-propylimidazolium iodide, 1-ethyl-3-butylimidazolium iodide, 1,3-propylimidazolium iodide, and 1-propyl-3-butylimidazolium iodide may be used. Specifically, 1-methyl-3-propylimidazolium iodide (PMII) may be used.

Further, the iodine ($I_2$) is dissolved by a solvent and acts as an iodine-based redox couple, that is, a source of I−/$I_3$−. The iodine has a relatively high corrosion, but has slow recombination reaction, good stability and reversibility, low absorption in a visible region, and high diffusivity, which increases the effect of redox reaction.

The organic solvent used in the above-described liquid electrolyte composition may be a solvent acting as a base of the electrolyte composition. As the organic solvent, an organic solvent typically used as an electrolyte composition of the dye-sensitized solar cell in the related art may be used. For example, acetonitrile, 3-methoxypropionitrile, valeronitrile, ethylene carbonate, propylene carbonate, polyethylene glycol, polypropylene glycol, tetrahydrofuran, a room-temperature molten salt containing imidazoliurn, pyrrolidinium or the like, and a mixture thereof may be used.

The above-described liquid electrolyte composition may be filled between the photo-electrode and the counter electrode by injection and sealing.

Hereinafter, the present disclosure will be described in more detail with reference to Examples. These Examples are for the purpose of explaining the present disclosure in more detail, and the scope of the present disclosure is not limited thereto. It should be noted that various variations and substitutions may be devised by those skilled in the art to which the present disclosure pertains without departing from the technical spirit of the present disclosure. Further, it should be construed that such variations and substitutions are included within the scope of the appended claims.

[Manufacture Example 1] Manufacture of Lighting Diffuser Plate (Dye: N719) According to the Present Disclosure

Manufacture Example 1-1

(1) Production of Photo-Electrode

A transparent glass substrate (made by Philkington Corporation, material: FTO, thickness: 2.2 cm, 8Ω(ohm)/sq (square) on which a tin oxide transparent conductive oxide layer doped with fluorine is formed was prepared as a substrate for a photo-electrode.

Thereafter, a metal oxide nanoparticle paste, which includes 18.5% (percentage) of titanium oxide nanoparticles (having an average particle diameter of 20 nm) by weight, 0.05% of a polymer for binder (ethylcellulose) by weight, and a remaining amount of solvent (Terpineol), was applied onto the substrate (by a doctor blade method). Subsequently, the substrate was subjected to a heat treatment at 500 degrees C. for 30 minutes to form a porous film (thickness: 2 μm (micrometer)) including the metal oxide nanoparticles. Subsequently, by immersing the composite electrode in an ethanol solution containing a ruthenium (Ru)-based photosensitive dye, that is, N719 (bis(tetrabutylarnrnonium)-cis-(dithiocyanato-N,N'-bis(4-carboxylato-4'-carboxylic acid-2, 2'-bipyridine)ruthenium(II)) of 0.5. mM, at 40 degrees C. for 4 hours, the photosensitive dye was adsorbed onto surfaces of the nanoparticles of the porous metal oxide layer (2) Production of Counter Electrode The transparent glass substrate (made by Philkington Corporation, material: FTO, thickness: 2.2 cm, 8Ω/sq) on which a tin oxide transparent conductive oxide layer doped with fluorine is formed was prepared. A 2-propanol solution in which a hexachloride platinic acid ($H_2PtCl_6$) was dissolved was dropped onto the transparent conductive oxide layer of the substrate. Thereafter, the substrate was subjected to the heat treatment at 400 degrees C. for 20 minutes to form a platinum layer, thus producing the counter electrode.

(3) Injection of Electrolyte and Sealing

The lighting diffuser plate was manufactured by injecting an electrolyte of an acetonitrile solution containing PMII (1-methyl-3-propylimidazolium iodide, 0.7M), $I_2$ (0.03M), and $Br_2$ (0.003M) was injected into a space between the photo-electrode and the counter electrode produced as above and sealing the space.

Manufacture Examples 1-2, 1-3 and 1-4

In Manufacture Examples 1-2, 1-3 and 1-4, a lighting diffuser plate was manufactured in the same manner as in Manufacture Example 1-1 except that the thickness of the porous film containing the metal oxide nanoparticles was changed to 2.5 μm (micrometer) (Manufacture Example 1-2), 3.5 μm (Manufacture Example 1-3), and 5 μm (Manufacture Example 1-4) in the production of the photo-electrode.

[Manufacture Example 2] Manufacture of Lighting Diffuser Plate (Dye: D35) According to the Present Disclosure In Manufacture Example 2, a lighting diffuser plate was manufactured in the same manner as in Manufacture Example 1-1 except that the thickness of the porous film containing the metal oxide nanoparticles was changed to 2.5 μm (Manufacture Example 2-1), 3.5 μm (Manufacture Example 2-2), 5 μm (Manufacture Example 2-3), and that the composite electrode was immersed in an ethanol solution containing D35 ((E)-3-(5-(4-(bis(2',4'-dibutoxy-[1,1'-biphenyl]-4-yl)amino)phenyl)thiophen-2-yl)-2-cyanoacrylic acid) of 0.2 mM as the photosensitive dye in the production of the photo-electrode.

[Manufacture Example 3] Manufacture of Lighting Diffuser Plate (Dye: HSQ4) According to the Present Disclosure In Manufacture Example 3, a lighting diffuser plate was manufactured in the same manner as in Manufacture Example 1 except that the thickness of the porous film containing the metal oxide nanoparticles was changed to 2.5 μm (Manufacture Example 3-1), 3.5 μm (Manufacture Example 3-2), and 5 μm (Manufacture Example 3-3), and that the composite electrode was immersed in an ethanol solution containing HSQ4 ((3Z,4Z)-4-((5-carboxy-3,3-dimethyl-1-octyl-3H-indol-1-ium-2-yl)methylene)-2-(((E)-5-carboxy-3,3-dimethyl-1-octylindolin-2-ylidene)methyl)-3-(1-cyano-2-ethoxy-2-oxoethylidene)cyclobut-1-en-1-olate) of 0.1 mM as the photosensitive dye in the production of the photo-electrode.

[Manufacture Example 4] Manufacture of Lighting Diffuser Plate (Dye: BTPA-DPP-DMP) According to the Present Disclosure In Manufacture Example 4, a lighting diffuser plate was manufactured in the same manner as in Manufacture Example 1-1 except that the thickness of the porous film containing the metal oxide nanoparticles was changed to 1.5 μm (Manufacture Example 4-1), and 5 μm (Manufacture Example 4-2) and that the composite electrode was immersed in an acetonitrile/T-amyl alcohol/toluene (1/1/0.4) solution containing bTPA-DPP-DMP ((3Z,4Z)-4-((5-carboxy-3,3-dimethyl-1-octyl-3H-indol-1-ium-2-yl)methylene)-2-(((E)-5-carboxy-3,3-dimethyl-1-octylindolin-2-ylidene)methy 1)-3-(1-cyano-2-ethoxy-2-oxoethy lidene) cyclobut-1-en-1-olate) of 0.025 mM as the photosensitive dye in the production of the photo-electrode.

Example 1

An open voltage (Voc), a photocurrent density (mA/cm$^2$), an energy conversion efficiency (PCE), a fill factor, and a light energy value incident per 1 cm' were measured on the lighting diffuser plate manufactured in Manufacture Example 1-1 by the following method.

(1) Open Voltage (Voc) and Photocurrent Density (MA/Cm$^2$)

: The open voltage and the photocurrent density were measured using SMU2400 instrument manufactured by Keithley Inc.

(2) Energy Conversion Efficiency (%) and Fill Factor (%) (Experiment on 1 Sun)

: The measurement of the energy conversion efficiency was performed using a solar simulator of 1.5 AM 100 mW/cm$^2$ (constituted with Xe lamp [1,600 W, manufactured by YAMASHITA DENSO], 1.5 filter manufactured by AM, and SMU2400 manufactured by Keithley Inc.), and the fill factor was calculated using the energy conversion efficiency obtained above and the following Equation 1.

$$\text{Fill factor}(\%) = \frac{(JxV)\max}{JscXVoc} \times 100 \quad \text{[Equation 1]}$$

In Equation 1 above, J is the Y-axis value of the conversion efficiency curve, Vis the X-axis value of the conversion efficiency curve, and Jsc and Voc are intercept values in the respective axes.

(3) Energy Conversion Efficiency (%) and Fill Factor (%) (Experiment on LED of 5,000 K)

3: The measurement of the energy conversion efficiency was performed using an LED lamp (input power: 0.4 sun, 40 mW/cm$^2$) and constituted with SMU2400 manufactured by Keithley Inc.), and the filling coefficient was calculated using the energy conversion efficiency obtained above and Equation 1 above).

A photoelectric property was measured using the lighting diffuser plate manufactured in Manufacture Example 1-1 with the illumination of LED at 1 sun. The results are illustrated in Table 1 below and FIGS. 4A and 4B.

(4) Incident Light Energy Per 1 $Cm^2$ ($MW/Cm^2$)

An optical spectrometer (manufactured by Avantes Inc., model name: AvaSpec-ULS2048XL-EVO-RS-UA) was used to measure the incident light energy per $cm^2$ ($mW/cm^2$).

(5) The power density was calculated by multiplying the incident light energy value per $cm^2$ by the energy conversion efficiency (%) obtained above, as in Equation 2 below.

$$\text{Output power density } (\text{mW/cm}^2) = \text{energy conversion efficiency } (\%) \times \text{incident light energy per 1 cm}^2\ (\text{mW/cm}^2) \quad \text{[Equation 2]}$$

TABLE 1

| | Active Region ($cm^2$) | Voc (V) | Isc (Jsc) (mA(mA/$cm^2$) | Fill factor (%) | PCE (%) | Pout (mW/$cm^2$) |
|---|---|---|---|---|---|---|
| Under 1 sun | 0.28 | 0.82 | 2.3 (8.3) | 73.57 | 5.0 | 2.18 |
| (100 mW/$cm^2$) | 100.8 | 6.0 | 110.87 | 52.35 | 3.5 | 348.24 |
| Under LED | 0.28 | 0.84 | 3.08 (10.92) | 73.89 | 17.1 | 2.5 |
| 5,000K(40 mW/$cm^2$) | 100.8 | 6.2 | 134.64 | 54.15 | 11.2 | 452.32 |

Figure 4A:
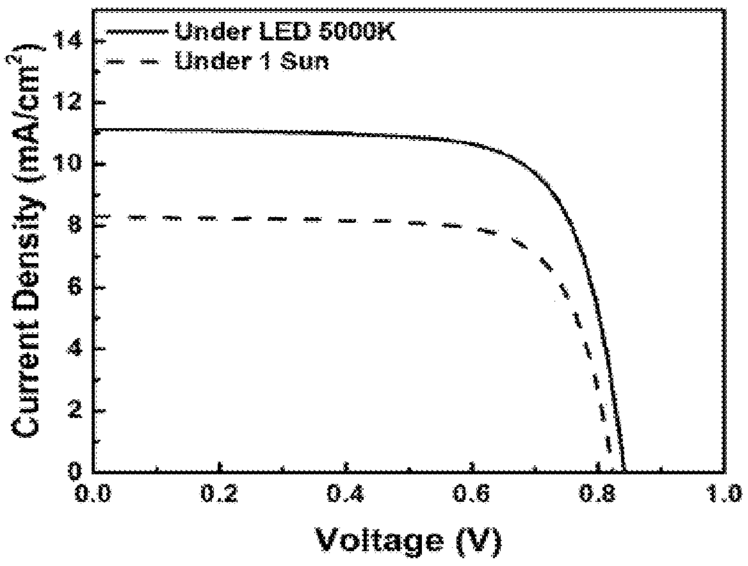
FIGS. 4A and 4B are graphs illustrating current densities as a function of voltage, which are measured under 1 sun (FIG. 4A) and an LED illumination of 5,000 K (Kelvin) (FIG. 4B) in the lighting apparatus system manufactured with the lighting diffuser plate of the present disclosure in Manufacture Example 1.
Figure 4B:
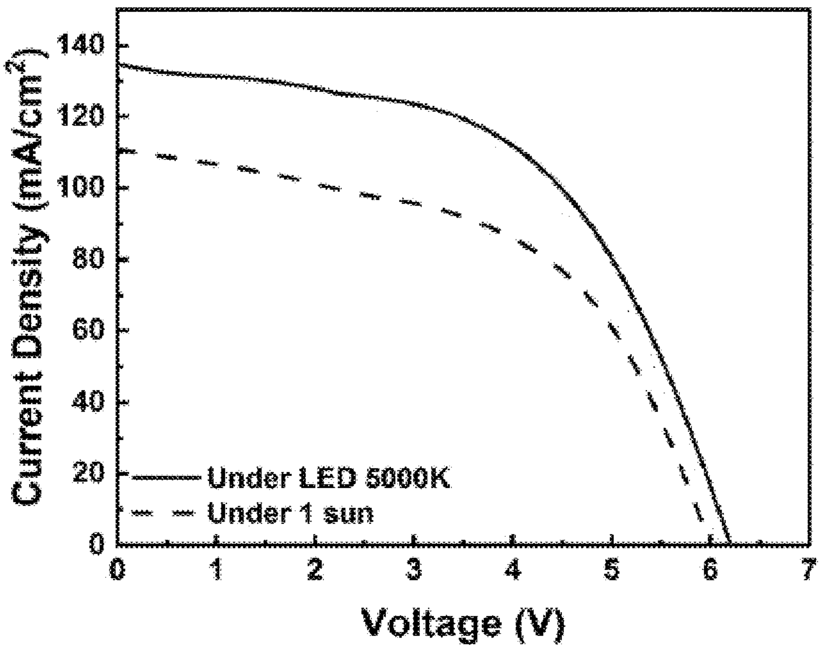

As illustrated in FIGS. 4A and 4B, and Table 1 above, it was confirmed that the lighting diffuser plate of the present disclosure exhibits a significantly improved energy conversion efficiency and output power density compared to the 1 sun under the condition of the LED illumination of 5,000 K. Specifically, in an experiment at an active region of 0.28 $cm^2$ (FIG. 4A), the energy conversion efficiency under the condition of the LED illumination of 5,000 K was further increased by 242% (that is, 5.0%+17.1%) and the output power density was further increased by about 14.7% (2.18 mW→+2.5 mW) compared to the condition of the 1 sun. In an experiment at an active region of 100.8 $cm^2$ (FIG. 4B), the energy conversion efficiency under the condition of the LED illumination of 5,000 K was further increased by 220% (3.5% 11.2%) and the output power density was further increased by about 30% (348.24 mW/$cm^2$+452.32 mW/$cm^2$) compared to the condition of the 1 sun.

Example 2

The Color coordinates and the emission spectrum were measured using the optical spectrometer (manufactured by Avantes Inc., model name: AvaSpec-ULS2048XL-EVO-RS-UA) to obtain color information about the light which is emitted lastly from the lighting apparatus system of the present disclosure including the lighting diffuser plate manufactured in Manufacture Example 1-1 under the condition of the LED illumination of 5,000 K.

Figure 5A:
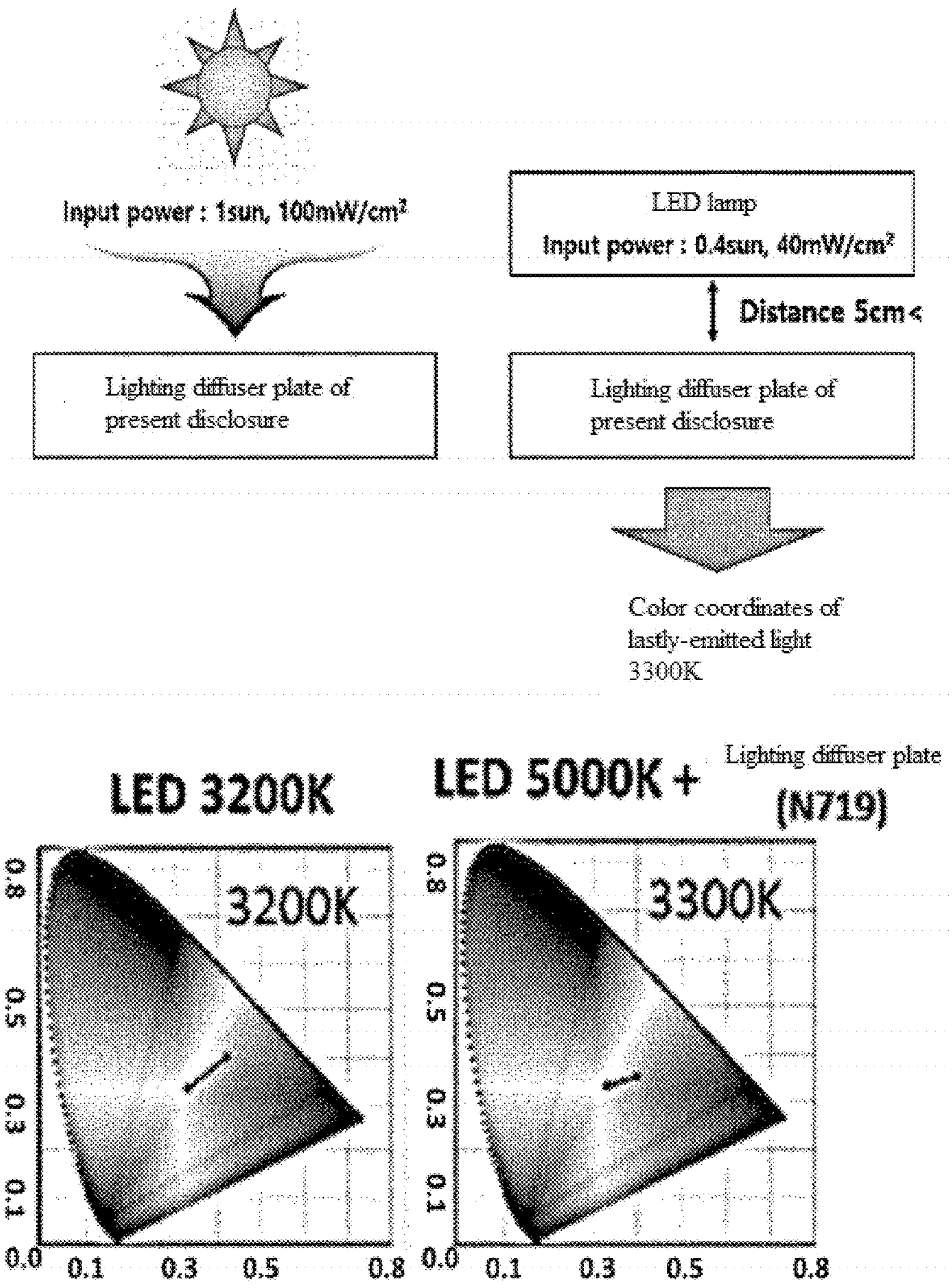
FIG. 5A is a Color coordinates of light emitted lastly from the lighting apparatus system including the lighting diffuser plate of the present disclosure, which is manufactured under the LED illumination of 5,000 K in Manufacture Example 1.
Figure 5B:
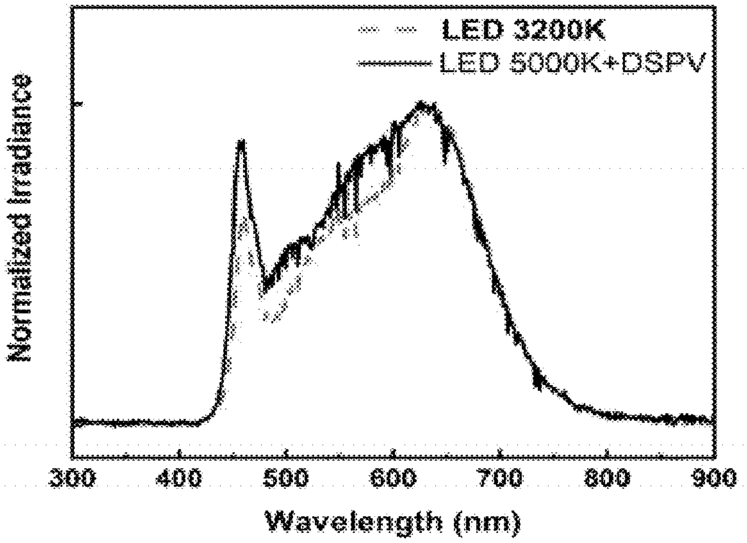
FIG. 5B is a graph illustrating a spectral measurement value of the light emitted lastly from the lighting apparatus system of FIG. 5A in comparison to an emission spectrum of an LED lamp of 3,200 K.

As a result, as illustrated in FIGS. 5A and 5B, the light emitted lastly from the lighting apparatus system of the present disclosure was almost identical to that under the LED illumination of 3,200 K in terms of the Color coordinates and the emission spectrum. Thus, it was confirmed that the lighting apparatus system of the present disclosure is capable of implementing light having a color temperature of 3,200 K that is frequently used by consumers, even after the collection of the light energy.

Example 3

A change in color temperature of the transmitted light emitted lastly when transmitting the incident lights of various color temperatures to the lighting apparatus system of the present disclosure including the diffuser plates for illumination manufactured with different dyes and porous films of different thicknesses in Manufacture Examples 1 to 4 was measured. The optical spectrometer (manufactured by Avantes Inc., model name: AvaSpec-ULS2048XL-EVO-RS-UA) was used to obtain information about the color temperature of the transmitted light.

As a result, as illustrated in Tables 2 to 5, the Color coordinates of the light emitted lastly from each of the lighting apparatus systems manufactured in Manufacture Examples 1 to 4 was changed from 1,622K at minimum to 8,724K at maximum. Specifically, Table 2 illustrates the results obtained by measuring the color temperatures of the transmitted lights that passed through the diffuser plates for illumination including different dyes and the porous films of different thicknesses, which are manufactured in Manufacture Examples 1 to 3, when an artificial light source having a color temperature in the range of 2,700 K to 7,200 K is used.

TABLE 2

| Thick. | Incident Light | N719 | D35 | HSQ4 |
|---|---|---|---|---|
| 2.5 | 2,700K | 1961 | 1848 | 2893 |
| 3.5 | | 1742 | 1763 | 3184 |
| 5 | | 1624 | 1646 | 3378 |
| 2.5 | 3,200K | 2146 | 1903 | 3187 |
| 3.5 | | 1844 | 1843 | 3462 |
| 5 | | 1622 | 1677 | 3639 |
| 2.5 | 3,700K | 2281 | 2045 | 3391 |
| 3.5 | | 1935 | 1973 | 3659 |
| 5 | | 1635 | 1709 | 3811 |
| 2.5 | 4,200K | 2441 | 2134 | 3610 |
| 3.5 | | 2041 | 2022 | 3862 |
| 5 | | 1661 | 1747 | 3994 |
| 2.5 | 4,500K | 2545 | 2193 | 3742 |
| 3.5 | | 2113 | 2056 | 3989 |
| 5 | | 1684 | 1774 | — |
| 2.5 | 4,700K | 2623 | 2236 | 3836 |
| 3.5 | | 2167 | 2149 | 4079 |
| 5 | | 1704 | 1796 | 4183 |
| 2.5 | 5,200K | 2825 | 2347 | 4071 |
| 3.5 | | 2314 | 2205 | 4284 |
| 5 | | 1765 | 1956 | 4368 |
| 2.5 | 5,500K | 2951 | 2416 | 4207 |
| 3.5 | | 2415 | 2245 | 4409 |
| 5 | | 1808 | 1892 | 4471 |
| 2.5 | 5,700K | 3033 | 2463 | 4207 |
| 3.5 | | 2471 | 2246 | 4488 |
| 5 | | 1840 | 1920 | 4540 |
| 2.5 | 6,200K | 3176 | 2538 | 4435 |
| 3.5 | | 2580 | 2380 | 4616 |

TABLE 2-continued

| Thick. | Incident Light | N719 | D35 | HSQ4 |
|---|---|---|---|---|
| 5 | | 1894 | 1967 | 4649 |
| 2.5 | 6,700K | 3310 | 2616 | 4580 |
| 3.5 | | 2698 | 2514 | 4748 |
| 5 | | 1958 | 2020 | 4765 |
| 2.5 | 7,200K | 3573 | 2766 | 4845 |
| 3.5 | | 2925 | 2570 | 4970 |
| 5 | | 2099 | 2125 | 4995 |

In Tables 2 to 4, the horizontal axis represents the type of photosensitive dye, the vertical axis (Thick.) represents the thickness (unit: μm) of the porous film and the color temperature (unit: K) of the incident light used for the lighting diffuser plate, respectively. Experimental data obtained from a combination of these numerical values represents the color temperature (K) of the transmitted light that passed through the lighting diffuser plate. For example, in Table 2, when the incident light of 2,700 K passes through the lighting diffuser plate (manufactured in Manufacture Example 1-2) in which the photosensitive dye of N719 is used and the thickness of the porous film is 2.5 μm, the color temperature of the transmitted light transmitted through the lighting diffuser plate is 1,961 K.

Table 3 illustrates the results obtained by measuring the color temperatures of the transmitted lights that passed through the diffuser plates for illumination manufactured in Manufacture Examples 1 to 3, when using the incident light ranging from 6,347 K to 7,100 K in which a green wavelength band is emphasized by combining green LED lights of various color temperatures with the light source of LED of 5,500 K.

TABLE 3

| Thick. | Incident Light | N719 | D35 | HSQ4 |
|---|---|---|---|---|
| 2.5 | 6,347K | | 3112 | 5121 |
| 3.5 | | 3184 | 2787 | 5272 |
| 5 | | 2278 | 2286 | 5327 |
| 2.5 | 6,785K | | | 5782 |
| 3.5 | | 3964 | 3452 | |
| 5 | | 2883 | 2846 | 5978 |
| 2.5 | 6,935K | | 4165 | 6058 |
| 3.5 | | 4305 | 3773 | 6161 |
| 5 | | 3212 | 3126 | 6193 |
| 2.5 | 7,027K | | 4342 | 6210 |

TABLE 3-continued

| Thick. | Incident Light | N719 | D35 | HSQ4 |
|---|---|---|---|---|
| 3.5 | | 4521 | 3964 | 6298 |
| 5 | | 3395 | 3292 | 6327 |
| 2.5 | 7,100K | | 4502 | 6327 |
| 3.5 | | 4685 | 4110 | 6412 |
| 5 | | 35778 | 3436 | 6457 |

Table 4 illustrates the results obtained by measuring the color temperatures of the transmitted lights that passed through the diffuser plates for illumination manufactured in Manufacture Examples 1 to 3, when using the incident light ranging from 7,954 K to 27,366 K in which blue and green wavelength bands are emphasized by combining blue and green LED lights of various color temperatures with the light source of LED of 5,500 K.

TABLE 4

| Thick. | Incident Light | N719 | D35 | HSQ4 |
|---|---|---|---|---|
| 2.5 | 7,954K | | 4543 | 6569 |
| 3.5 | | 4934 | 4153 | 6636 |
| 5 | | 3747 | 3476 | 6614 |
| 2.5 | 10,847K | | 4626 | 7153 |
| 3.5 | | 5561 | 4191 | 7128 |
| 5 | | 4188 | 3560 | 6965 |
| 2.5 | 16,357K | | 4730 | 7939 |
| 3.5 | | 6473 | 4246 | 7786 |
| 5 | | 4807 | 3668 | |
| 2.5 | 21,053K | | 4773 | 8302 |
| 3.5 | | 6988 | 4276 | 8102 |
| 5 | | 5155 | 3713 | 7600 |
| 2.5 | 27,366K | | 4822 | 8724 |
| 3.5 | | 7569 | 4301 | 8468 |
| 5 | | | 3767 | 7814 |

Table 5 illustrates the results obtained by measuring the color temperature of the incident light so that the transmitted light that passed through the lighting diffuser plate manufactured in Manufacture Example 4 has the color temperature of 2,700 K to 7,500 K by adjusting the color temperature of the incident light. For example, the color temperature of the incident light by which the transmitted light that passed through the lighting diffuser plate (manufactured in Manufacture Example 4-1) in which the thickness of the porous film is 1.5 μm, has the color temperature of 2,700 K, is 3,396 K.

TABLE 5

| Thick. | Incident Light | bTPA-DPP-DMP | Thick. | Incident Light | bTPA-DPP-DMP | Thick. | Incident Light | bTPA-DPP-DMP |
|---|---|---|---|---|---|---|---|---|
| 1.5 | 3396 | 2,700K | 1.5 | 4946 | 4,700K | 1.5 | 5908 | 6,700K |
| 5.0 | 3025 | | 5.0 | 4573 | | 5.0 | 5439 | |
| 1.5 | 3827 | 3,200K | 1.5 | 5250 | 5,200K | 1.5 | 6060 | 7,200K |
| 5.0 | 3259 | | 5.0 | 4793 | | 5.0 | 5568 | |
| 1.5 | 4242 | 3,700K | 1.5 | 5401 | 5,500K | 1.5 | 6213 | 7,500K |
| 5.0 | 3776 | | 5.0 | 4990 | | 5.0 | 5639 | |
| 1.5 | 4644 | 4,200K | 1.5 | 5478 | 5,700K | | | |
| 5.0 | 4179 | | 5.0 | 5125 | | | | |
| 1.5 | 4827 | 4,500K | 1.5 | 5696 | 6,200K | | | |
| 5.0 | 4412 | | 5.0 | 5277 | | | | |

From the above, it was confirmed that various colors may be implemented by using different incident lights, different dyes, and porous films of different thicknesses in the lighting diffuser plate of the present disclosure. In particular, it was found that the color adjustment is sufficiently possible in the range of 2,700 K to 7,600 K, which is known as a range of color temperature of common commercial illumination. Specifically, the color adjustment of the transmitted light may be performed by (1) using red-, green- and blue-series of photosensitive dyes, (2) changing the color temperature of a single incident light, (3) using the incident light in which a specific wavelength band is emphasized by combining two types or more of lights, and (4) appropriately combining (1) to (3) above.

Example 4

In order to evaluate the usefulness of the light implemented finally by a lighting apparatus system of the present disclosure in which the LED illumination is used as an artificial light source, LED light of 7,600 K was irradiated to the lighting diffuser plate manufactured in Manufacture Examples 1-1, and the Color coordinates of the lastly-obtained light and the spectrum of that light were measured.

Figure 6A:
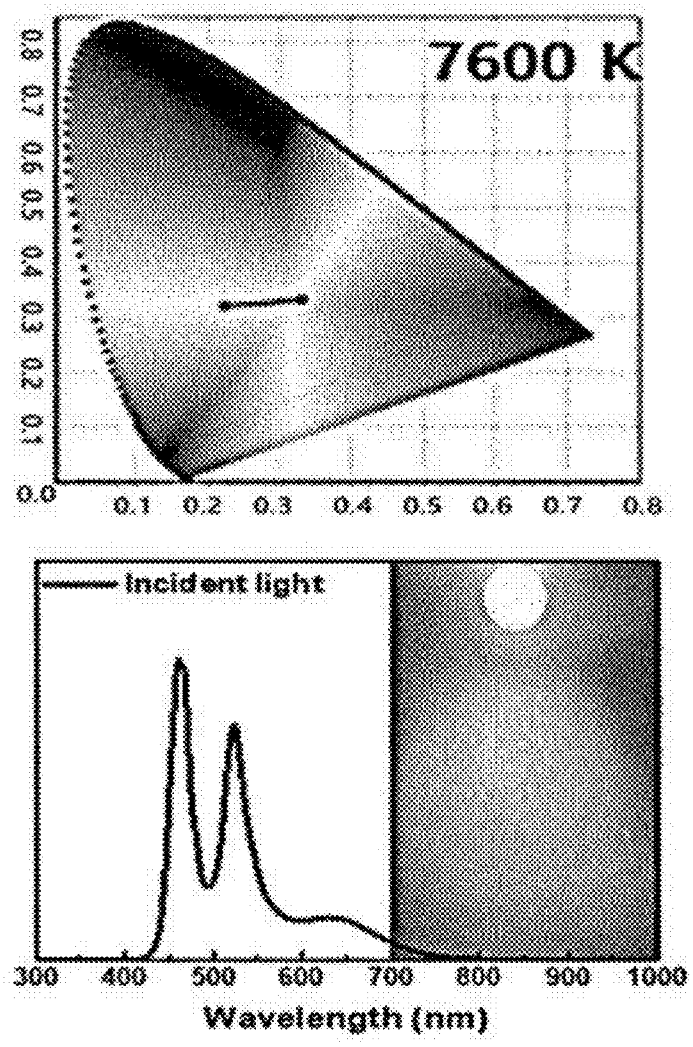
FIG. 6A illustrates a Color coordinates and an emission spectrum of an LED lamp of 7,600 K, and a photograph obtained by capturing a light source.
Figure 6B:
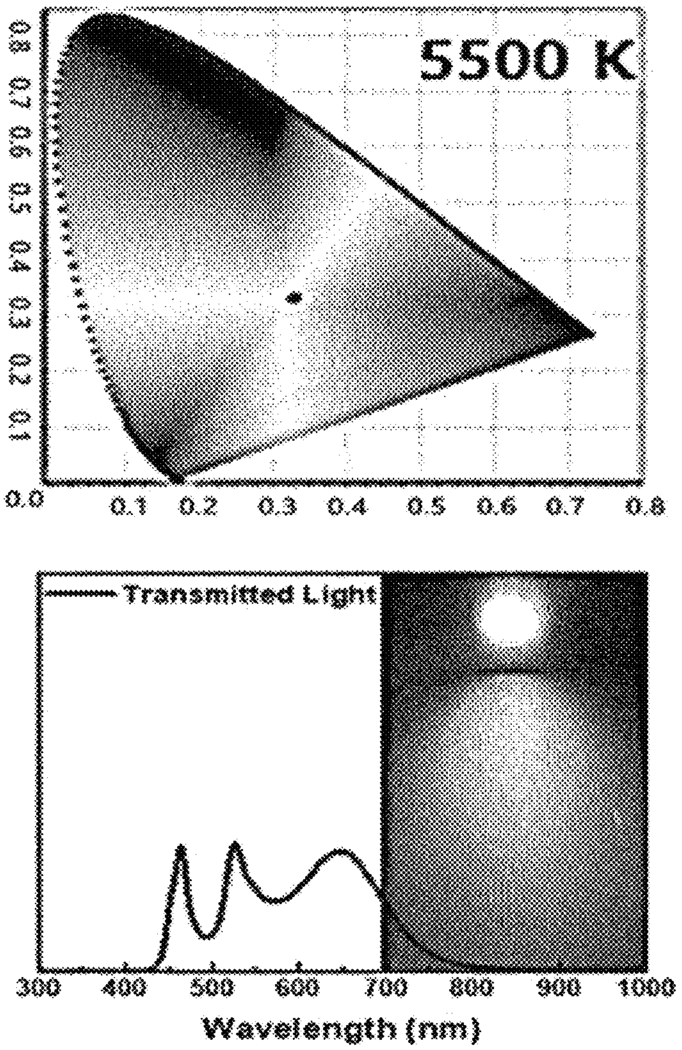
FIG. 6B illustrates a Color coordinates of an LED lamp of 5,500 K, a graph illustrating an emission spectrum of light transmitted through the lighting apparatus system including the LED lamp of 7,600 K and the lighting diffuser plate of the present disclosure, and a photograph obtained by capturing the transmitted light.
Figure 6C:
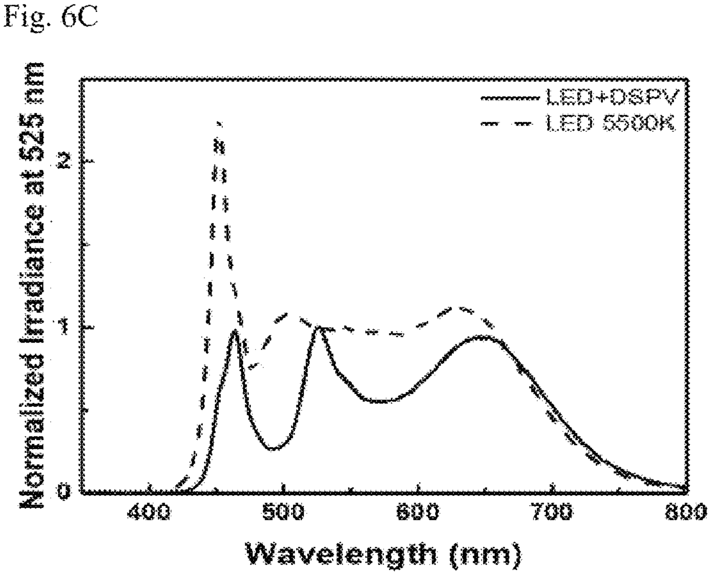
FIG. 6C is a graph illustrating the emission spectrum of the transmitted light in FIG. 6B in comparison to the emission spectrum of the LED lamp of 5,500 K.

FIG. 6A is a graph illustrating the Color coordinates and emission spectrum of the LED lamp of 7,600 K, and a photograph obtained by capturing the light source. FIG. 6B is a graph illustrating the Color coordinates of the LED lamp of 5,500 K and the emission spectrum of the transmitted light that passed through the lighting apparatus system including the LED lamp of 7,600 K and the lighting diffuser plate of the present disclosure, and a photograph obtained by capturing the transmitted light. FIG. 6C is a graph illustrating the emission spectrum of the transmitted light in FIG. 6B in comparison to the emission spectrum of the LED lamp of 5,500 K.

As a result of the measurement, as seen from FIGS. 6B and 6C, it has been confirmed that the lighting apparatus system of the present disclosure may implement the white light of 5,500 K which is frequently used by consumers, even after the collection of the light energy.

Example 5

Figure 7:
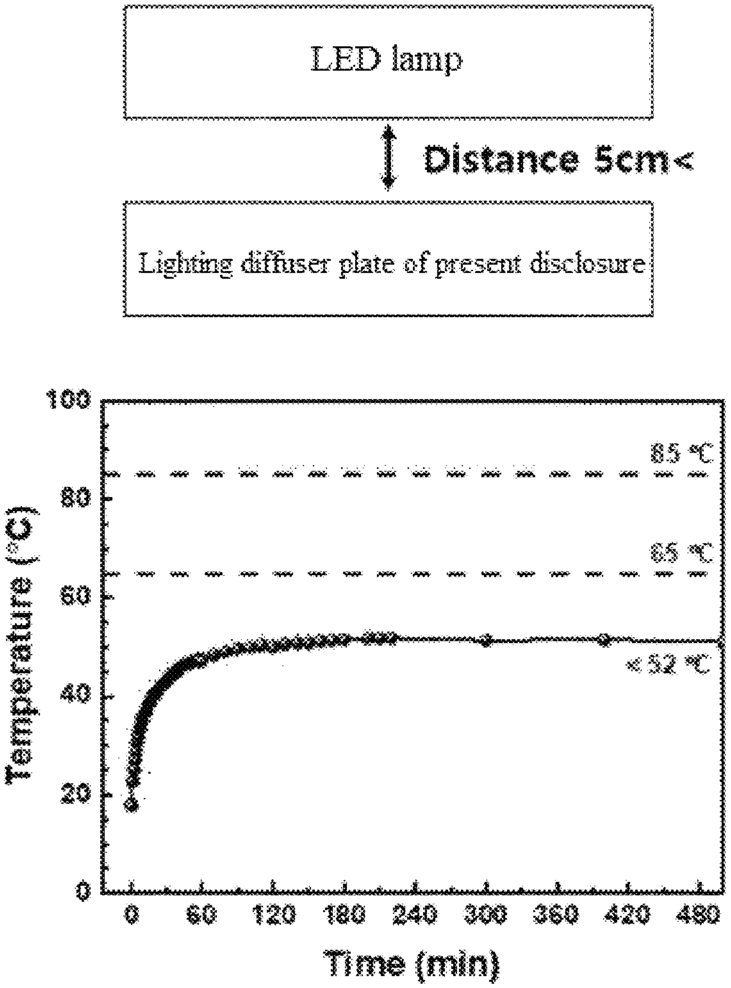
FIG. 7 is a graph illustrating measurement results of a change in temperature of the lighting diffuser plate over time, in which a distance between the lighting diffuser plate of the present disclosure manufactured in Manufacture Example 1 and the LED lamp is set to 5 cm.

In order to confirm the influence of the temperature on the lighting diffuser plate of the present disclosure when the LED lamp is used as an artificial light source, a distance between the lighting diffuser plate manufactured in Manufacture Example 1-1 and the LED lamp was set to 5 cm and a time-dependent temperature change was measured. As a result, it was confirmed that, as illustrated in FIG. 7, the temperature of the lighting diffuser plate of the present disclosure is not increased to 52 degrees C. or more even though the distance between the lighting diffuser plate and the LED lamp is 5 cm. From this, even if the LED lamp is used as the artificial light source for the lighting diffuser plate of the present disclosure, the issue of the stability of the lighting diffuser plate due to the temperature is expected to not occur.

INDUSTRIAL APPLICABILITY OF THE PRESENT DISCLOSURE

The lighting diffuser plate of the present disclosure and the lighting apparatus system comprising same may be directly applied to various lightings such as an indoor light, an emergency light, a mood light, a light for transportation, a smart light and the like, and may be integrated into an IT information network based on a power-saving light quantity analysis technology, a power-saving situation recognition technology, and a power-saving LED lighting control technology, and a power-saving effect measurement technology. In addition, the lighting diffuser plate of the present disclosure and the lighting apparatus system comprising same may be used to control lighting fixtures in various lighting environments, thereby minimizing unnecessary energy consumption, and is expected to have great use as a smart indoor lighting apparatus system which allows various changes according to a changes in residential environment by being connected to a complex sensor such as a temperature sensor, a humidity sensor, and an illuminance sensor. In addition, the lighting diffuser plate of the present disclosure and the lighting apparatus system comprising same are expected to have a variety of applications, such as a standard platform that supports flexibility in the design of the LED lighting, lightness, thinness and compactness, and network support, and may be easily combined with technologies in the related field, which makes it possible to respond to rapid market changes and meet needs of various users. In addition, through the lighting diffuser plate of the present disclosure and the lighting apparatus system comprising same, various product designs may be implemented, which is expected to have a significant ripple effect on product development and market development.

Further, according to the present disclosure, it is possible to provide a design optimized for consumers and lighting environments and implement various colors, which makes it highly usable as emotional lighting. In addition, the lighting diffuser plate and the lighting apparatus system comprising same may be manufactured as a self-charging and driving integrated system, which enables continuous use even in high-risk environments (fire, earthquake, power outage and the like). Further, the lighting diffuser plate and the lighting apparatus system comprising same may be operated without power and supply power to peripheral electrical equipment. Thus, there are no restrictions on installation location. In addition, since an existing indoor lighting may be used as is, the installation is very easy, replacement is possible at low cost. The lighting diffuser plate and the lighting apparatus system comprising same may be designed to enable power supply based on an IoT-type sensor. This is very useful in smart environments

EXPLANATION OF REFERENCE NUMERALS

100: Photo-electrode
101*a*, 101*b*: Transparent glass substrate or flexible substrate
102*a*, 102*b*: Conductive transparent film
103: Porous film containing metal oxide nanoparticles
110: Counter electrode
111: Nanoparticle metal film layer
120: Electrolyte
130: Polymeric adhesive layer

What is claimed is:

1. A lighting diffuser plate comprising:

(a) a photo-electrode formed on a transparent glass substrate coated with a conductive film and including a metal-oxide nanoparticle porous film onto which a photosensitive dye is adsorbed;

(b) a counter electrode provided to face the photo-electrode at a distance, formed on the transparent glass substrate coated with a conductive film and including a nanoparticle metal film layer; and (c) a liquid electrolyte composition filled between the photo-electrode and the counter electrode;

wherein the metal oxide nanoparticles used for the photo-electrode are nanoparticles of one or more kinds of oxides selected from the group consisting of: tin (Sn) oxide; antimony (Sb)-, niobium (Nb)-or fluorine-doped tin (Sn) oxide; indium (In) oxide; tin-doped indium (In) oxide; zinc (Zn) oxide; aluminum (Al)-, boron (B)-, gallium (Ga)-, hydrogen (H)-, indium (In)-, yttrium (Y)-, titanium (Ti)-, silicon (Si)-or tin (Sn)-doped zinc (Zn) oxide; magnesium (Mg) oxide; cadmium (Cd) oxide; magnesium zinc (MgZn) oxide; indium zinc (InZn) oxide; copper aluminum (CuAl) oxide; silver (Ag) oxide; gallium (Ga) oxide; zinc Sn oxide (ZnSnO); titanium dioxide (TiO) and zinc indium (ZIS) oxide; nickel (Ni) oxide; rhodium (Rh) oxide; ruthenium (Ru) oxide; iridium (Ir) oxide; copper (Cu) oxide; cobalt (Co) oxide; tungsten (W) oxide; titanium (Ti) oxide; zirconium (Zr) oxide; strontium (Sr) oxide; lanthanum (La) oxide; vanadium (V) oxide; molybdenum (Mo) oxide; niobium (Nb) oxide; aluminum (Al) oxide; ytnium (Y) oxide; scandium (Sc) oxide; samarium (Sm) oxide; and strontium titanium (SrTi) oxide;

wherein the thickness of the metal oxide nanoparticle porous film is 1.5 to 5 μm;

wherein the conductive film includes $SnO_2$:F, ITO, a metal electrode having an average thickness of 1 to 1,000 nm, a metal nitride, a metal oxide, a carbon compound, or a conductive polymer;

wherein the photosensitive dye is an organic-inorganic composite dye including an element selected from the group consisting of aluminum (Al), platinum (Pt), palladium (Pd), europium (Eu), lead (Pb), iridium (Ir), ruthenium (Ru), selenium (Se), teleride (Te), sulfur (S) and a complex thereof;

wherein the nanoparticle metal used when forming the nanoparticle metal film layer is at least one selected from the group consisting of platinum (Pt), activated carbon, graphite, carbon nanotube, carbon black, p-type semiconductor, PEDOT (poly(3,4-ethylenedioxythiophene))-PSS (poly(styrenesulfonate)), polyaniline-CSA, pentacene, polyacetylene, P3HT (poly (3-hexylthiophene), polysiloxane carbazole, polyaniline, polyethylene oxide, (poly (1-methoxy-4-(0-disperd1)-2,5-phenylene-vinylene), polyindole, polycarbazole, polypyridinazine, polyisothianaphthalene, polyphenylene sulfide, polyvinylpyridine, polythiophene, polyfluorene, polypyridine, polypyrrole, polypersulfide, a derivative thereof, a copolymer thereof, and a mixture thereof;

wherein the liquid electrolyte composition includes a redox derivative and an organic solvent;

wherein the redox derivative is at least one selected from the group consisting of: a metal halide salt containing lithium iodide, sodium iodide, potassium iodide, lithium bromide, sodium bromide, and potassium bromide; a quaternary ammonium salt; an imidazolium salt; a pyridinium salt; a pyrrolidinium salt; a pyrazolium salt; an isothiazolidinium salt; an isooxazolidinium salt, and a cobalt-based nitrogen-containing heterocyclic compound;

wherein the organic solvent contained in the liquid electrolyte composition is at least one selected from the group consisting of acetonitrile, 3-methoxypropionitrile, valeronitrile, ethylene carbonate, propylene carbonate, polyethylene glycol, polypropylene glycol, and tetrahydrofuran, or is obtained by adding a room-temperature molten salt containing imidazolium and pyrrolidinium to the one or more elements;

wherein the lighting diffuser plate is capable of collecting light energy from an artificial light source;

wherein a color temperature of the artificial light source is within a range of 2,500 K to 9,000 K, or a range of 3,000 K to 7,600 K; and wherein a color temperature of a transmitted light passing through the lighting diffuser plate is 2,700 K to 7,600 K.

2. The lighting diffuser plate of claim 1, wherein the conductive film is a fluorine-doped tin oxide layer (FTO) or an indium tin oxide layer (ITO).

3. The lighting diffuser plate of claim 1, wherein the metal oxide nanoparticles used for the photo-electrode are the titanium dioxide (TiO) nanoparticles.

4. The lighting diffuser plate of claim 1, wherein the photosensitive dye is selected from the group consisting of N719 (bis(tetrabutylammonium)-cis-(dithiocyanato-N,N'-bis(4-carboxylato-4'-carboxylic acid-2,2'-bipyridine)ruthenium(II)), D35 ((E)-3-(5-(4-(bis(2',4'-dibutoxy-[1,1'-biphenyl]-4-yl)amino)phenyl)thiophen-2-yl)-2-cyanoacrylic acid), HSQ4 ((3Z,4Z)-4-((5-carboxy-3,3-dimethyl-1-octyl-3H-indol-1-ium-2-yl)methylene)-2-(((E)-5-carboxy-3,3-dimethyl-1-octylindolin-2-ylidene)methyl)-3-(1-cyano-2-ethoxy-2-oxoethylidene)cyclobut-1-en-1-olate), or bTPA-DPP-DMP ((3Z,4Z)-4-((5-carboxy-3,3-dimethyl-1-octyl-3H-indol-1-ium-2-yl)methylene)-2-(((E)-5-carboxy-3,3-dimethyl-1-octylindolin-2-ylidene)methyl)-3-(1-cyano-2-ethoxy-2-oxoethylidene)cyclobut-1-en-1-olate).

5. The lighting diffuser plate of claim 1, the nanoparticle metal used when forming the nanoparticle metal film layer is platinum (Pt).

6. The lighting diffuser plate of claim 1, wherein the redox derivative is produced by dissolving iodine ($I_2$) in imidazolium iodide salt.

7. A lighting apparatus system comprising:

an artificial light source; and the lighting diffuser plate of claim 1, which is positioned below the artificial light source and configured to collect the light energy from the artificial light source.

8. The lighting apparatus system of claim 7, wherein the artificial light source is at least one selected from the group consisting of an LED lamp, a Red-Green-Blue lamp, and a fluorescent lamp.

9. An illumination comprising:

the lighting apparatus system of claim 7; and an interior light, an emergency light, a mood light, an illumination for transportation and a smart illumination.

* * * * *